(12) United States Patent
Cude

(10) Patent No.: US 7,648,606 B2
(45) Date of Patent: Jan. 19, 2010

(54) WEIGHT FREE TIRE BALANCING SYSTEM

(76) Inventor: Perry L. Cude, P.O. Box 319, 2006 Cotton Pointe, Leachville, AR (US) 72438

(*) Notice: Subject to any disclaimer, the term of this patent is extended or adjusted under 35 U.S.C. 154(b) by 348 days.

(21) Appl. No.: 11/394,984

(22) Filed: Mar. 30, 2006

(65) Prior Publication Data

US 2007/0227637 A1    Oct. 4, 2007

(51) Int. Cl.
*B29D 30/00*    (2006.01)
*B29D 30/06*    (2006.01)
*B60C 11/00*    (2006.01)

(52) U.S. Cl. .......... 156/110.1; 152/450; 152/154.1; 152/209.1; 156/344

(58) Field of Classification Search .......... 152/154.1
See application file for complete search history.

(56) References Cited

U.S. PATENT DOCUMENTS 1,692,145 A * 11/1928 Woolson .......... 152/154.1
2,311,999 A * 2/1943 Purvis .......... 152/154.1
2,339,718 A * 1/1944 Periat .......... 152/154.1
2,640,727 A * 6/1953 Kennedy .......... 301/5.21

FOREIGN PATENT DOCUMENTS

JP      62048536    * 3/1987
JP      11254911    * 9/1999
JP      2005-125930 * 5/2005

* cited by examiner

*Primary Examiner*—Justin Fischer
(74) *Attorney, Agent, or Firm*—Hani Z. Sayed; Rutan & Tucker, LLP

(57) ABSTRACT

An improved apparatus, system and method of balancing a tire for a vehicle is provided. In an exemplary embodiment, a new tire for a vehicle is provided wherein the tire incorporates a plurality of removable portions and/or attachments that may be removed from their position on the external portion of the tire to properly balance the tire about the wheel assembly. Further, a system and method is provided that may be employed to properly balance the tire without the necessity of adding metal or other type weights to the wheel and tire assembly.

3 Claims, 4 Drawing Sheets

WEIGHT FREE TIRE BALANCING SYSTEM

BACKGROUND OF THE INVENTION

1. Field of the Invention

This invention relates generally to field of tire technology, more specifically, to a tire rotation system that allows for automatic balancing of the tire without the necessity of placing additional weights on the tire to keep it in balance.

2. Description of the Prior Art

The history of the wheel dates back almost six thousand years to approximately 3500 BC. However, even though the wheel has been around for centuries, the invention of the tire came thousands of years later. Over the course of time, the majority of wheels had been made of wood which guaranteed a rough ride and poor construction and maintenance to go along with it.

The evolution of the wheel was very simple. The wheel was constructed of a solid, curved piece of wood, then leather was eventually added to soften the ride. As time progressed, it became solid rubber which lead to today's tires, the pneumatic or air inflated, radial tire.

Early wheels were made of metal or wood but were not very durable and provided very little comfort in their ride. The first type of tire was really just a metal loop. There were many individuals that made contributions in creating the tire that we have today. The tires we have in today's society are much more durable, flexible and more reliable that the tires from just fifty years ago. More importantly, today's tires are far more comfortable than the old wood and metal hoop type wheels that came before the modern tire.

Rubber as a foundation of the tire has evolved significantly since its start. Early rubber did not hold shape, nor was it nearly as durable and long-lasting as it is today. Early rubber was very sticky in hot weather and became inflexible when it was subjected to cold weather. It could easily fall apart and/or snap if the temperature conditions weren't appropriate or ideal. In the 1800's, Charles Goodyear was credited with discovering the vulcanization process. Vulcanization is the process of heating rubber with sulfur. This transforms sticky raw rubber to form a pliable material that makes rubber a much better candidate for tire material.

Later in rubber development, tires were made out of solid rubber. These tires were strong, absorbed shocks and resisted cuts and abrasions. However, some of the problems with the solid rubber tire was that they were very heavy, expensive and did not provide a smooth ride. Even today, there are several types of tires that are made of solid rubber which allows for resilient tires that resist cuts and abrasions.

The next advancement in the tire industry was the invention of the pneumatic rubber tire. The pneumatic rubber tire uses rubber and enclosed air to reduce vibration and improve traction. The air filled tired that we use today came early in the life span of tires, but too early as it did not catch on for quite some time. The lighter pneumatic tire provided a much better ride quality, was much lighter and more cost effective to produce than the earlier solid rubber tires.

For much of the early $20^{th}$ century, most vehicle tires were made up of an inner tube that contained compressed air and an outer casing. The plys were made of rubberized fabric cords that were embedded in the rubber. These tires were known as bias-ply tires. They were named bias ply because the cords in a single ply ran diagonally from the beads on one inner rim to the beads on the other. However, the orientation of the cords is reversed from ply to ply so that the cords crisscross each other. Many of today's classic and/or antique vehicles still use bias-ply tires as do many off-road vehicles.

The first introduced steel-belted radial tires appeared in Europe in the mid $20^{th}$ century. The radial tires are so named because the ply cords radiate at a 90 degree angle from the wheel rim, and the casing is strengthened by a belt of steel fabric that runs around the circumference of the tire.

The Radial tire has ply cords that are made of nylon, rayon or polyester. The advantages of radial tires is that they typically have longer tread life, better steering and less rolling resistance, which may increase gas mileage of a vehicle. On the other hand, radials have a harder riding quality and are typically very expensive comparative to other types of tires.

One of the major problems with tires that are mounted to a wheel is that the tire can become imbalanced. This imbalance can be caused by a plurality of different factors including uneven wear, driving style, road conditions, weight, camber and a host of others. The imbalance of a tire may cause improper ride quality and can eventually lead to tire blowout. Properly balancing a tire requires that the tire and wheel assembly be removed from the vehicle and a specific machine used to determine if the tire is properly balanced on the wheel. If the tire is improperly balanced, a weight mechanism is attached to the attachment point between the tire and the wheel. The weight mechanism is typically a small metal attachment that is attached to the wheel assembly at a specific point to counteract the balance problem. When a sufficient amount of weight has been applied to the tire/wheel assembly, the tire/wheel assembly may be remounted on the vehicle and normal driving of the vehicle may continue.

Thus a need therefore exists for an improved system for balancing a tire that does not require the addition of elements, such as the weight mechanism to the tire for proper balancing of the tire for a vehicle. The present invention satisfies this need and provides related advantages as well.

SUMMARY OF THE INVENTION

The present invention provides an improved apparatus, system and method of balancing a tire for a vehicle. The present invention is directed at a new tire for a vehicle wherein the tire incorporates a plurality of removable portions there from to properly balance the tire about the wheel assembly. Further, the present invention relates to a system and method that may be employed to properly balance the tire without the necessity of adding metal or other type weights to the wheel and tire assembly.

To this end, in an exemplary embodiment of the present invention, a tire weighting system is provided. The tire weighting system has a wheel assembly removably attached to a vehicle and a tire attached to the wheel assembly. Moreover, the tire weighting system has at least one removable attachment embedded within the tire for balancing the weight of the tire about the wheel assembly.

In exemplary embodiment, the tire weighting system has at said at least one removable attachment embedded in the side wall of the tire.

In an exemplary embodiment, the tire weighting system has said at least one removable attachment embedded in the tread channel on the top portion of the tire.

In an exemplary embodiment, the tire weighting system has at least one removable attachment located at any position on the tire wherein the removal of the attachment would counter any improper weighting or balance of the tire about the wheel assembly.

In an exemplary embodiment, the tire weighting system has at least one removable attachment being removed from said tire with an extraction device.

In an exemplary embodiment, the tire weighting system has a tire and wheel assembly that does not need to be removed from the vehicle in order to properly balance and weight the tire about the wheel assembly.

In an exemplary embodiment, the tire weighting system has a tire and an attachment that are made of a resilient rubber material.

In an exemplary embodiment, the weighting system has a tire and at least one attachment that are made of any resilient material.

In an exemplary embodiment, the weighting system has a tire and at least one attachment that are manufactured as a singular element.

In an exemplary embodiment of the present invention, a tire weighting apparatus is provided. The tire weighting apparatus has a wheel assembly removable from a vehicle and a synthetic tire attached to the wheel assembly. Moreover, the tire weighting apparatus has said tire having at least one removable attachment thereon wherein the removal of said attachment changes the weight and balance of the tire attached to the wheel assembly.

In an exemplary embodiment, the tire weighting apparatus has a plurality of attachments positioned on a side wall of the tire.

In an exemplary embodiment, the tire weighting apparatus has a plurality of attachments positioned within tread channels on the tire.

In an exemplary embodiment, the tire weighting apparatus has at least one removable attachment embedded into a side wall of the tire.

In an exemplary embodiment, the tire weighting apparatus has at least one removable attachment embedded into tread channels of the tire.

In an exemplary embodiment of the present invention, a method for using a new tire weighting system is provided. The method comprising the steps of: providing a wheel assembly whereby the wheel assembly is coupled to a vehicle; removably attaching a tire to the wheel assembly; providing a plurality of embedded attachments located at a position on the tire; and providing an attachment removal tool.

In an exemplary embodiment, the method further comprising the step of: providing a device to check the weight and balance of the tire while the tire is situated on the wheel assembly.

In an exemplary embodiment, the method further comprising the step of: allowing for removal of the embedded attachments from the side wall of the tire.

In an exemplary embodiment, the method further comprising the step of: allowing for removal of the embedded attachments from the tread channels of the tire.

In an exemplary embodiment, the method further comprising the step of: checking the weight and balance of the tire positioned on the wheel assembly to ensure proper balancing and distribution of weight about the wheel assembly.

It is, therefore, an advantage of the present invention to provide a unique tire weighting system.

Another exemplary embodiment of the present invention is to provide a unique tire weighting system with a unique integrated design.

Still another exemplary embodiment of the present invention is to provide a unique tire weighting system wherein the tire weighting system may allow for proper balancing of a vehicle tire.

Yet another exemplary embodiment of the present invention is to provide a unique tire weighting system wherein the system may allow for proper balancing of a vehicle tire wherein the vehicle tire is a car tire.

Still another exemplary embodiment of the present invention is to provide a unique tire weighting system wherein the system may allow for proper balancing of a vehicle wherein the vehicle may be a car, motorcycle, off-road vehicle, airplane tire, lawnmower and/or any other vehicle that is susceptible to off balance of a tire.

Another exemplary embodiment of the present invention is to provide a unique tire weighting system wherein the system may be used without removing the wheel assembly from the vehicle.

Another exemplary embodiment of the present invention is to provide a unique tire weighting system wherein the tire system may be employed by removing the wheel assembly from the vehicle to determine whether the tire requires balancing.

In an exemplary embodiment of the present invention is to provide a unique tire weighting system wherein the system employs a unique tire having pre-determined weight bearing elements thereon.

Still another exemplary embodiment of the present invention is to provide a unique tire weighting system wherein the system employs a unique tire wherein the tire may have a plurality of pockets contained on the tire wherein the pockets may be removed to properly balance a vehicle tire.

Yet another exemplary embodiment of the present invention is to provide a unique tire weighting system with a unique tire design wherein the tire may have a plurality of pockets contained on the outside walls that may be removed from the tire.

Yet another exemplary embodiment of the present invention is to provide a unique tire weighting system with a unique tire wherein the tire may have a plurality of removable rubber pegs on the outside wall of the tire which may be removed to properly balance the weight distribution of the tire with respect to the wheel assembly.

Another exemplary embodiment of the present invention is to provide a unique tire weighting system wherein the wheel and tire assembly does not need to be removed from the vehicle to properly balance the tire weight.

Still another exemplary embodiment of the present invention is to provide a unique tire weighting system with a unique tire design wherein the tire may have a plurality of removable attachments that are integrated into the tire which maybe removed to offset weight imbalances.

Another exemplary embodiment of the present invention is to provide a unique tire weighting system with a unique tire design wherein the tire may have a plurality of removable attachments that are integrated into the side wall of the tire which may be removed to offset weight imbalances.

Yet another exemplary embodiment of the present invention is to provide a unique tire weighting system with a unique tire design wherein the tire may have a plurality of removable attachments that are integrated into the top, contact portion of the tire and may be removed to offset weight imbalances.

Still another exemplary embodiment of the present invention is to provide a unique tire weighting system with a unique tire design wherein the tire may have a plurality of removable attachments wherein the attachments are made of the same material that the tire is made whereby the tire may be integrated with such attachments at the time the tire is constructed with the integrated attachments thereon.

An exemplary embodiment of the present invention is to provide a unique tire weighting system with a unique tire design wherein the tire may have a plurality of removable attachments wherein the attachments are integrated into the tire design wherein the attachments could be removed from the tire with minimal effort and without destroying the integrity of the tire.

Yet another exemplary embodiment of the present invention is to provide a unique tire weighting system with a unique tire design wherein the tire may have a plurality of removable attachments wherein the attachments are fully integrated into the tire and may be removed from the tire when necessary to balance the weight of the tire about the wheel assembly.

Another exemplary embodiment of the present invention is to provide a unique tire weighting system with a unique tire design wherein the tire may have a plurality of removable attachments wherein the attachments may be positioned on the side wall of the tire and are further positioned at several locations about the circumferential design of the tire.

Still another exemplary embodiment of the present invention is to provide a unique tire weighting system with a unique tire design wherein the tire may have a plurality of attachments wherein the attachments may be removed from the tire without the need for any special tools.

Yet another exemplary embodiment of the present invention is to provide a unique tire weighting system with a unique tire design wherein the tire may have a plurality of removable attachments positioned on the tread pattern of the tire wherein when necessary, the removable attachments may be removed from within the tread pattern to balance the weight of tire about the wheel assembly.

An exemplary embodiment of the present invention is to provide a unique tire weighting system with a unique tire design wherein the removable attachments may be externally attached to the tire.

A further exemplary embodiment of the present invention is to provide a unique tire weighting system with a unique tire design wherein the tire may have a plurality of removable attachments that may be removed without the need to remove the tire from the wheel assembly.

Yet another exemplary embodiment of the present invention is to provide a unique tire weighting system with a unique tire design wherein the tire may have a plurality of channels in the tread pattern wherein the channels may contain removable sections.

Still another exemplary embodiment of the present invention is to provide a unique tire weighting system with a unique tire design wherein the tire may have a plurality of channels in the thread pattern wherein the channels may contain removable sections wherein the sections may be removed to properly balance a vehicle tire when necessary.

Another exemplary embodiment of the present invention is to provide a unique tire weighting system with a unique tire design wherein the tire may have a plurality of channels contained in the side wall of the tire for removal of sections contained with the channels to remove weight from a portion of the side wall that may allow for proper balancing of the tire about the wheel assembly.

A further exemplary embodiment of the present invention is to provide a unique tire weighting system with a unique tire design wherein the tire may have a plurality of channels contained thereon wherein the channels may have removable sections thereon wherein the removal of said sections may allow for proper balancing of the tire about the wheel assembly without the need for additional weights to be placed on the wheel assembly.

Yet another exemplary embodiment of the present invention is to provide a unique tire weighting system that may have a unique tire design wherein the tire may have a plurality of channels on both the side walls of the tire and on the tread portion of the tire wherein the channels may have removable sections that may be removed to properly balance the tire about the wheel assembly.

Still another exemplary embodiment of the present invention is to provide a unique tire weighting system with a unique tire design wherein in an exemplary embodiment, the tire is made of rubber.

Another exemplary embodiment of the present invention is to provide a unique tire weighting system with a unique tire design wherein in an exemplary embodiment, the tire is made of any resilient material practical for use as a vehicle tire.

An exemplary embodiment of the present invention is to provide a unique tire weighting system with a unique integrated design wherein the valve system may include a rod within an outer sleeve that may raise a valve lid by a pivoting lever at the end of the rod.

These and other objects of the invention will become more clear when one reads the following specification, taken together with the drawings that are attached hereto. The scope of protection sought by the inventors may be gleaned from a fair reading of the Claims that conclude this specification.

Additional features and advantages of the present invention are described in, and will be apparent from the detailed description of the presently preferred embodiments and from the drawings.

DESCRIPTION OF THE PREFERRED EMBODIMENT

Figure 1:
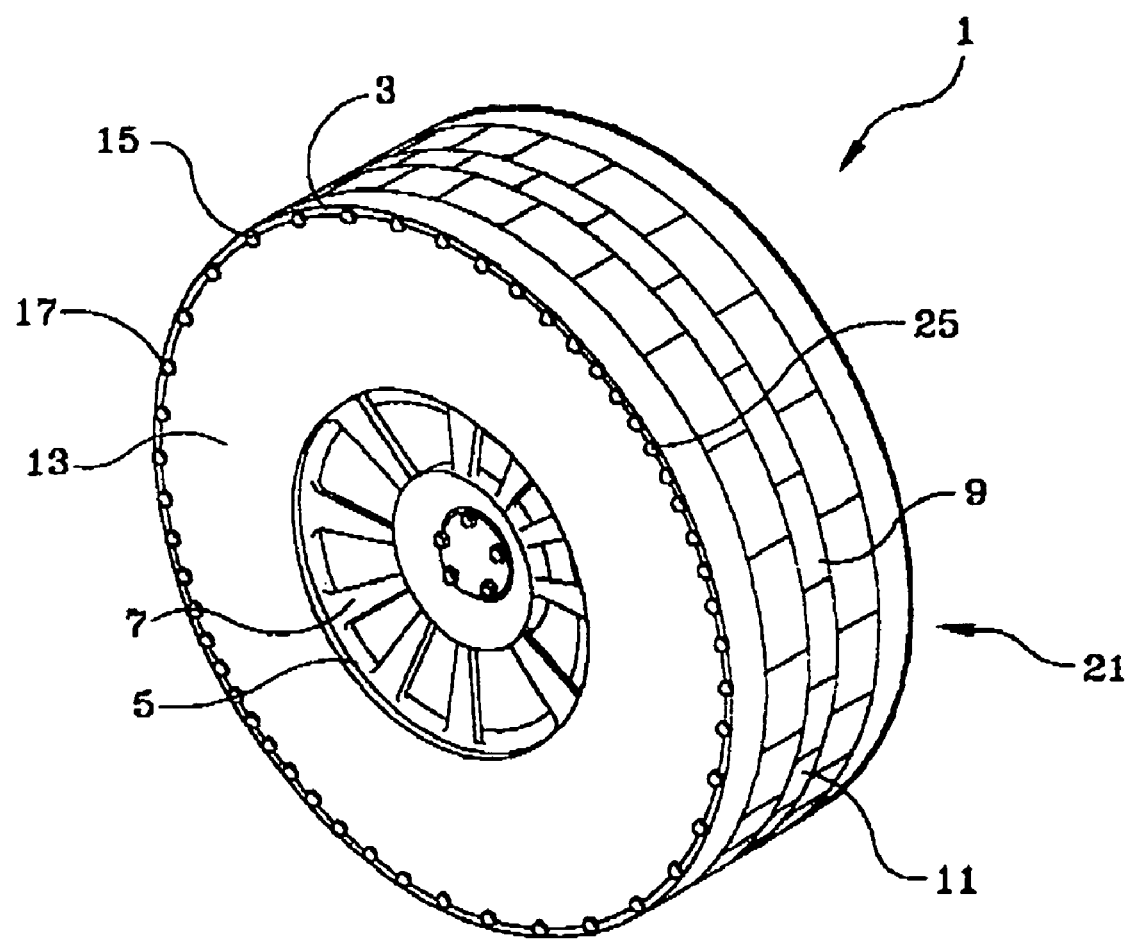
FIG. 1 is a perspective view of a tire and wheel assembly showing an exemplary embodiment of the invention.

Turning now to the drawings wherein elements are identified by numbers and like elements are identified by like numbers throughout the 5 figures, the invention is depicted in FIG. 1 and shows a tire and wheel assembly 1 for a new weighted tire system. The tire and wheel assembly 1 may have a tire 3 attached to a wheel assembly 5, which in an exemplary embodiment consists of a hub 7 or similar assembly. As illustrated in FIG. 1, the tire 3 may be attached to a wheel assembly 5 in an exemplary embodiment. However, in an embodiment, the tire 3 may have a plurality of tread channels 9 on the top portion 11 of the tire 3. The top portion 11 may have tread channels 9 that contact the surface of a road. The tread channels 9 may be located on the side wall 13 of the tire, but is preferably located on the top portion 11 of the tire 3. As illustrated in FIG. 1, the tire 3 may have a plurality of predetermined conduits 15 that are positioned on the side wall 13 of the tire. The conduits 15 may be comprised of a material that is removable from the tire 3 by removing the contents of the material from the conduit 15. In an exemplary embodiment, the conduit may integrated attachments 17 that are made of the same material that the tire 3 is made from. The attachments 17 are constructed at the same time as the entire tire 3 such that the attachments 17 are fully integrated into the tire 3 and can be easily accessed when desired to properly weight and balance the tire 3.

As further illustrated in FIG. 1, the tire may have these integrated attachments 17 at multiple positions on the side wall 13 of the tire. FIG. 1 illustrates only one side wall 13, but it should be understood that both the first side wall 13 and the second side wall 21 may have a plurality of integrated attachments 17 contained thereon. In an exemplary embodiment, a user of the tire 3 would be provided with an attachment removal device (not shown). The attachment removal device (not shown) may be utilitized to remove a specific integrated attachment 25 from the side wall 13 of the tire 3. Once removed from the side wall 13 of the tire 3, the individual attachment 25 may be completely discarded. The effect of removing an individual attachment 25 from the sidewall 13 of the tire 3 would be that a portion of the weight of a tire 3 would be offset from the specific region of the tire that had an attachment 25 removed therefrom. The attachment 25 removal would cause a lightening of the tire 3 at the point of removal which may compensate for uneven wear on the tire 3 or other factors that might be a factor for uneven distribution of weight on the tire 3.

Figure 2:
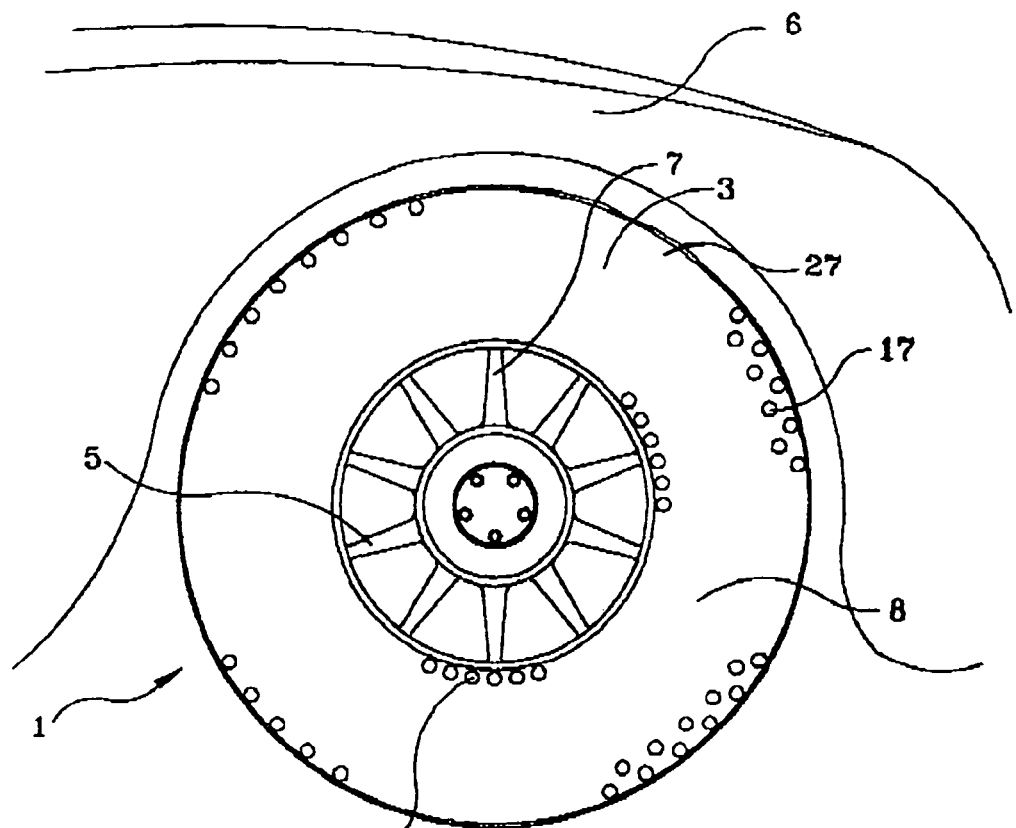
FIG. 2 is a side view the tire and wheel assembly illustrating an exemplary embodiment of the present invention.

FIG. 2 illustrates a front view of the tire 3 as attached to a vehicle 6. The tire 3 may have a side wall 13 that may contain a plurality of attachments 17. The attachments 17 may be positioned in specific areas of the side wall 13 including the top portion 27 of the side wall 13, whereby an increased amount of tire material may be employed to allow for easier removal of the material from the attachments 17. However, in another exemplary embodiment of the present invention, the attachments 17 may be positioned on any appropriate portion of the side wall 13 of the tire 3, including the bottom portion 29. The bottom portion 29 may be positioned in close proximity to the wheel assembly 5, and may be directly adjacent thereto. However, it should be understood that the attachments 17 may be positioned anywhere on the side wall 13 of the tire 3. The tire 3 in an exemplary embodiment may be constructed of a resilient material to hold shape even after the removal of the attachments 17 from the side wall 13 of the tire 3. In a preferred embodiment, the tire may be constructed of a synthetic rubber-type compound. However, in an exemplary embodiment, the tire 3 may be constructed of any suitable resilient material that may allow for structural support of a vehicle 6.

Figure 3:
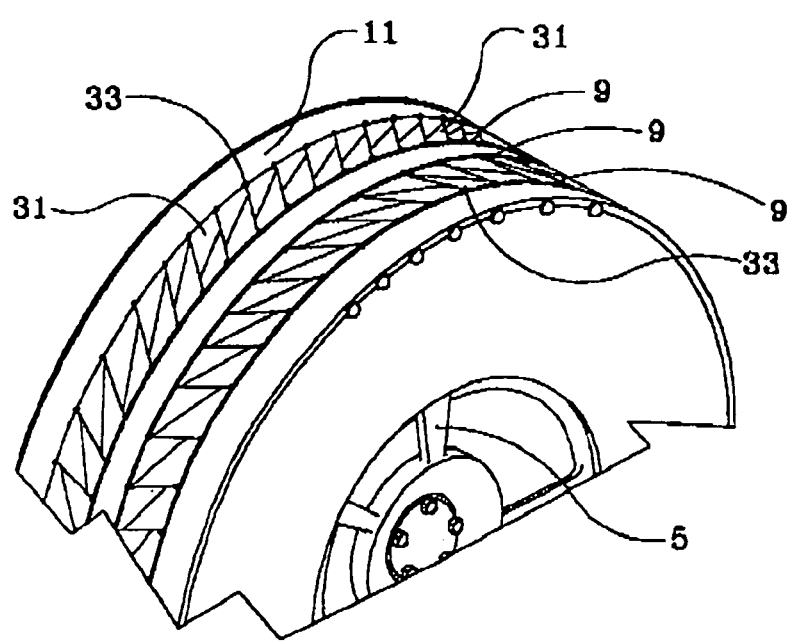
FIG. 3 is a front perspective view of a portion of the tire and wheel assembly showing an exemplary embodiment of the present invention.

FIG. 3 illustrates a front perspective view of the tire 3 and wheel assembly 5 of the invention 1. As illustrated in FIG. 3, the tire 3 may have tread channels 9 that may be positioned on the top portion 11 of the tire. The tire 3 may also have tread 31 that may contact the road surface not shown. The tread 31 may be constructed of the same resilient material that the entire tire 3 is comprised of. The top portion 11 of the tire 3 may have tread channels 9 wherein the tread channels 9 may have a plurality of attachments 33 thereon. The attachments 33 may be embedded in the tread channels 9 as to not interfere with the tread portion 31 of the tire 3 that contacts the road surface not shown. The attachments 33 may be removed from the tread channels 9 to reduce or to counter weight distribution problems that may be encountered. In a further exemplary embodiment of the present invention, the attachments 33 may be embedded directly onto the tread portion 31 of the tire. In this way, the attachments 33 may be easily removed from the tread portion 31 and discarded and may allow for proper distribution of weight about the wheel assembly 5.

Figure 4:
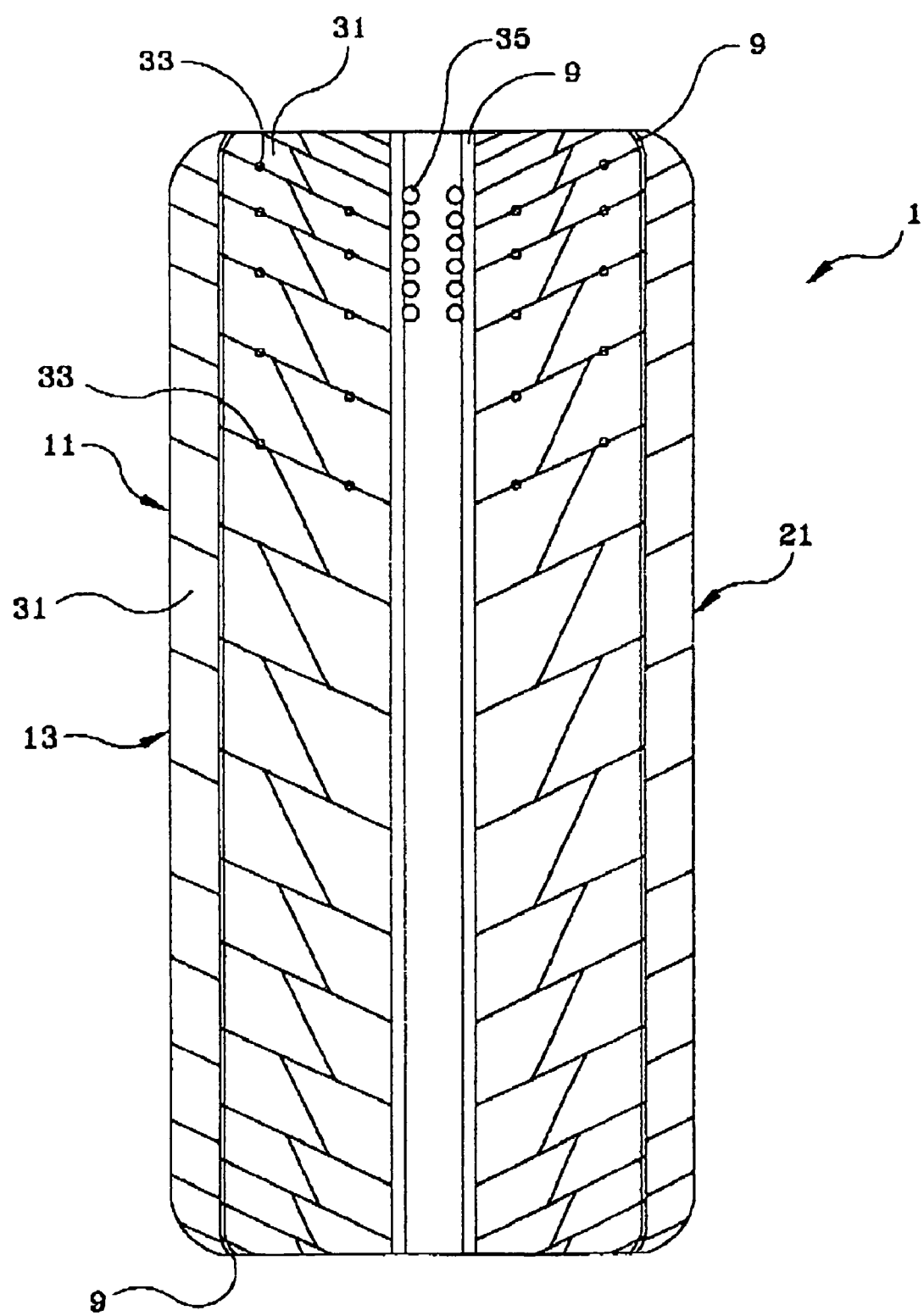
FIG. 4 is front view of the tire showing an exemplary embodiment of the present invention.

As illustrated in FIG. 4, the tire may have tread channels 9 and tread portions 31 on the top portion of the tire. The tread channels 9 may be of sufficient space to allow for attachment 33 placement therein. The attachments 33 may be embedded in the tread channels 9 as to not interfere with the tread portion 31 of the tire 3 that contacts the road surface not shown. In an exemplary embodiment, the attachments 33 may be embedded directly into the tread portions 31 of the tire 3 such that they are easily accessed by an individual that desires to remove the attachments 33 to facilitate proper weighting and balancing of the tire 3.

FIG. 4 further illustrates that the tread channels 9 may have a plurality of attachments 33 embedded therein. Additionally, in an exemplary embodiment, the treads themselves may have attachments 33 embedded thereon. In an exemplary embodiment, the attachments embedded in the treads and/or tread channels 9 may be removed by the user to correct a weighting or balancing problem contained within the tire 3 structure. The removal of an attachment 33 or a plurality of attachments from a specific location on the tire 3 would enable the balancing and proper weight distribution of the tire 3 about the wheel assembly 5 thus correcting any potential balance or weight problems incurred while driving the vehicle 6.

Figure 5:
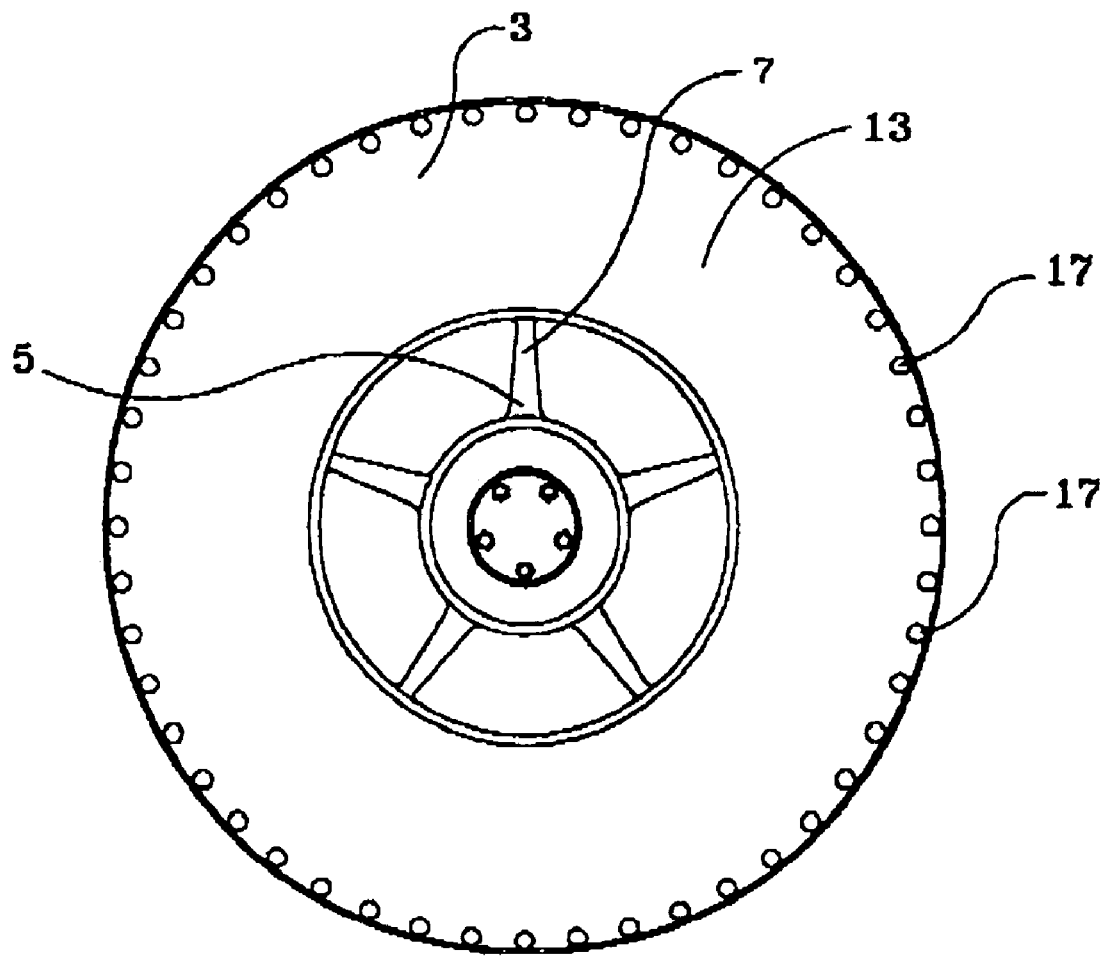
FIG. 5 is a side view of the tire and wheel assembly showing an exemplary embodiment of the present invention.

FIG. 5 illustrates the side wall 13 of the tire 3 wherein the side wall 13 may have a plurality of attachments 17 embedded therein. As illustrated in FIG. 5, the attachments 17 may be at any position about the side wall 13 and may allow for the removal of the attachments 17 from any position of the side wall 13 of the tire 3 to properly weight and balance the tire 3 about the wheel assembly. In an exemplary embodiment, the tire 3 would be manufactured with the attachments 17 already embedded therein by the use of injection molding wherein the removable attachments 17 would be introduced during the molding process and could be easy built into the construction of the tire 3. Additionally, in an exemplary embodiment, the attachments may be added to an existing tire 3 by embedding removable attachments 17 into the existing tire 3.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A method for using a new tire weighting system, said method comprising the steps of:
   providing a tire having a plurality of removable attachments which are embedded therein with the use of injection molding and introduced during the molding process;
   providing a wheel assembly whereby the wheel assembly is coupled to a vehicle;
   removably attaching a tire to the wheel assembly;
   providing a plurality of embedded attachments located at a position on the tire whereby the attachments are constructed integrally with the construction of the tire;
   providing an attachment removal tool;
   removing at least one attachment from the tire to balance the same; and
   wherein said at least one attachment is removed from a tread channel of said tire.

2. The method of claim 1, further comprising the step of:
   providing a device to check the weight and balance of the tire while the tire is situated on the wheel assembly.

3. The method of claim 1, further comprising the step of:
   checking the weight and balance of the tire positioned on the wheel assembly to ensure proper balancing and distribution of weight about the wheel assembly.

\* \* \* \* \*